No. 694,793. Patented Mar. 4, 1902.
A. M. SCHIELE.
KITCHEN RACK.
(Application filed Oct. 5, 1901.)
(No Model.)
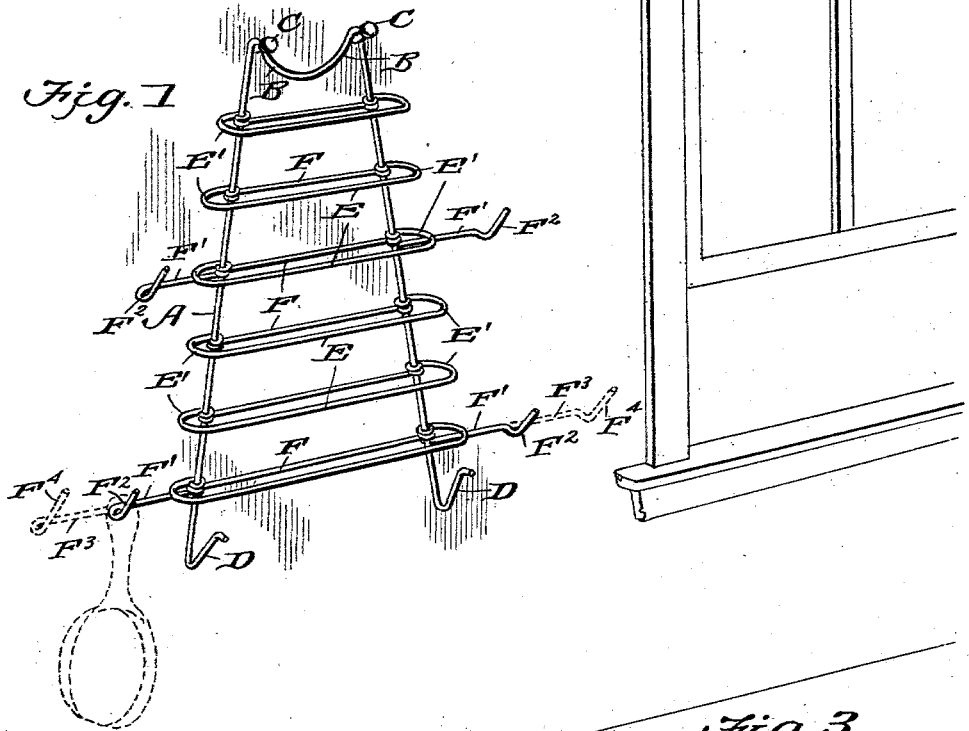
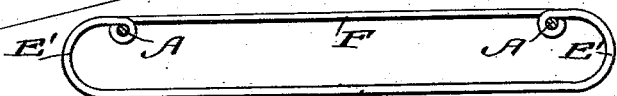
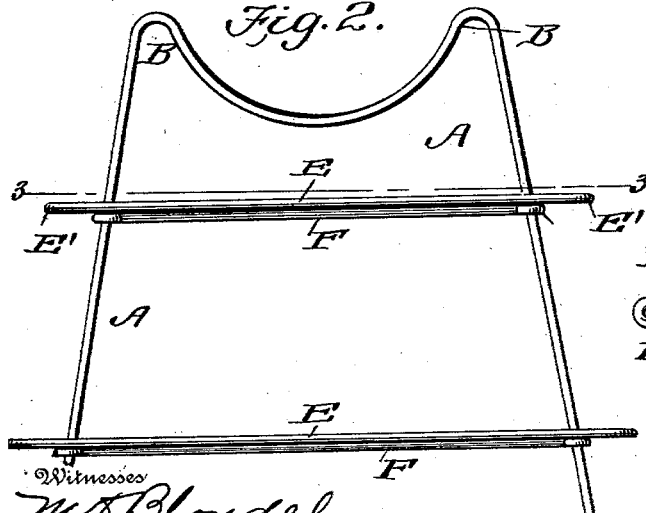
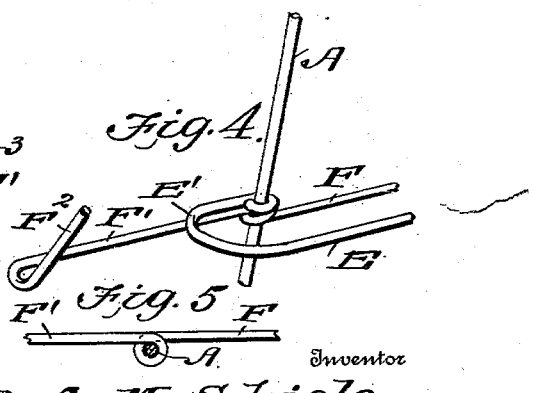
Inventor
A. M. Schiele.

UNITED STATES PATENT OFFICE.

ANNA M. SCHIELE, OF PHILADELPHIA, PENNSYLVANIA.

KITCHEN-RACK.

SPECIFICATION forming part of Letters Patent No. 694,793, dated March 4, 1902.

Application filed October 5, 1901. Serial No. 77,729. (No model.)

*To all whom it may concern:*

Be it known that I, ANNA M. SCHIELE, a citizen of the United States, residing at Philadelphia, in the county of Philadelphia and State of Pennsylvania, have invented a new and useful Improvement in Kitchen-Racks, of which the following is a specification.

This invention is a rack particularly adapted for kitchen use; and the object of the invention is to provide an exceedingly cheap and simple form of rack which can be arranged in a kitchen for the purpose of supporting pans, skillets, and similar articles.

The invention consists in certain details of construction and novelties of combination, all of which will be fully described hereinafter and pointed out in the claims.

In the drawings forming part of this specification, Figure 1 is a perspective view illustrating a rack constructed in accordance with my invention. Fig. 2 is a front elevation illustrating the upper portion of the rack. Fig. 3 is a section on the line 3 3 of Fig. 2. Fig. 4 is an enlarged detail in perspective, and Fig. 5 is an enlarged detail in plan.

In carrying out my invention I employ a stout piece of wire A, which is bent adjacent to the center, as shown at B, to provide suitable suspending-loops which are adapted to fit over nails C, driven into the wall of the kitchen. The members gradually diverge and terminate at their lower ends in hooks D. Connecting the suspending members are a series of wire-rack members E, each member E being coiled around the wire A, curved slightly outwardly, as shown at E', thereby supporting the main portion of the rack member at a distance from the wall and parallel thereto. At the point where the rack members are attached the members of the wire A are also connected by means of the connecting-wires F, the ends of which are wound around the members of the wire A. At regular intervals the wire F is continued outwardly after being wound around the wire A, as shown at F', and terminates in the hook F$^2$, and, if desired, this extended portion F may be provided with an extension member F$^3$, which terminates in a hook F$^4$. The connecting-wires F prevent the suspending members from spreading and also serve to support in a measure the rack members E, it being noted that the ends of the rack members are connected to the suspending members at points above the ends of the connecting-wires F. Inasmuch as the suspending-arms diverge at their lower ends the rack members will be of varying lengths, the lowermost rack being the longest, as most clearly illustrated.

A rack constructed as above described can be suspended on a wall or other fixed object and will be capable of receiving and holding a large number of kitchen utensils, and inasmuch as the said rack is formed entirely of wire it can be quickly and easily cleansed whenever desired.

Having thus fully described my invention, what I claim as new, and desire to secure by Letters Patent, is—

1. A rack consisting of two suspending-rods terminating in hooks at their lower ends, the connecting rods or bars projecting beyond the suspending-rods and terminating in hooks, and the rack members connected to the suspending-rods and extending outwardly therefrom and adapted to rest parallel with the wall, substantially as described.

2. A rack comprising the suspending bars or rods connected at their upper ends, and formed with loop portions at their upper ends and terminating in hooks at their lower ends, the connecting-rods and the rack members attached to the suspending-bars above the connecting-rods, one or more of the connecting-rods extending beyond the suspending-bars and terminating in hooks, substantially as described.

ANNA M. SCHIELE.

Witnesses:
MARGARET L. WALTER,
L. H. JENKINS.